US012752660B2

(12) United States Patent
Bohnet et al.

(10) Patent No.: US 12,752,660 B2
(45) Date of Patent: Oct. 6, 2026

(54) SYSTEMS AND METHODS FOR INTERRUPTING A CHARGING CIRCUIT OF AN ELECTRIC VEHICLE

(71) Applicant: Space Saver Distribution, Inc., Las Vegas, NV (US)

(72) Inventors: Adam C. Bohnet, Las Vegas, NV (US); Christel Kathleen Hunter, Las Vegas, NV (US); Randal Bob Hunter, Las Vegas, NV (US); Dorothy A McCarley, Las Vegas, NV (US); Wendy Bertini, Las Vegas, NV (US)

(73) Assignee: Space Saver Distribution, Inc., Las Vegas, NV (US)

( * ) Notice: Subject to any disclaimer, the term of this patent is extended or adjusted under 35 U.S.C. 154(b) by 926 days.

(21) Appl. No.: 18/159,248

(22) Filed: Jan. 25, 2023

(65) Prior Publication Data

US 2024/0246441 A1 Jul. 25, 2024

(51) Int. Cl.

| | |
|---|---|
| ***H02J 7/00*** | (2026.01) |
| ***B60L 53/62*** | (2019.01) |
| ***B60L 53/63*** | (2019.01) |
| ***H02J 7/62*** | (2026.01) |

(52) U.S. Cl.

CPC ............... *B60L 53/63* (2019.02); *B60L 53/62* (2019.02); *H02J 7/62* (2026.01)

(58) Field of Classification Search

USPC .......................................................... 320/109

See application file for complete search history.

(56) References Cited

U.S. PATENT DOCUMENTS

| | | | | |
|---|---|---|---|---|
| 10,862,306 | B2 * | 12/2020 | Graßl | H02J 7/02 |
| 11,422,161 | B2 * | 8/2022 | Gabrielsson | G01R 15/146 |
| 2011/0251732 | A1 * | 10/2011 | Schweitzer, III | H02J 3/12 700/297 |
| 2016/0075246 | A1 * | 3/2016 | Liptak | B60L 3/04 320/109 |
| 2020/0139835 | A1 * | 5/2020 | Miler | B60L 53/63 |
| 2021/0336440 | A1 * | 10/2021 | Canales | H02J 3/34 |
| 2022/0131396 | A1 * | 4/2022 | Chen | H02J 7/751 |

* cited by examiner

*Primary Examiner* — Samuel Berhanu

(74) *Attorney, Agent, or Firm* — Shumaker, Loop & Kendrick, LLP

(57) ABSTRACT

Systems and methods for interrupting a charging circuit configured to facilitate regulating an electric current to an electric vehicle charger that is electrically coupled to an electrical control switch. An electric current is transmitted from the electrical control switch to a power distribution block that is configured to split the electric current to, in part, a current transformer, via a first compact circuit protector, and the current transformer is configured to further transmit the electric current to an electrical device. The electric current that is split from the power distribution block is further transmitted, via a second compact circuit protector, to a contactor that has a default position that is closed to further transmit the electric current to the electric vehicle charger. Upon activation of an electrical device, the contactor is energized to open, thereby interrupting current flow to the electric vehicle charger.

19 Claims, 6 Drawing Sheets

SYSTEMS AND METHODS FOR INTERRUPTING A CHARGING CIRCUIT OF AN ELECTRIC VEHICLE

FIELD OF THE INVENTION

This invention relates generally to electric vehicle charging, and more particularly, embodiments of the invention relate to systems and methods for interrupting a charging circuit of electric vehicle.

BACKGROUND OF THE INVENTION

Reliable, efficient and timely charging is needed to charge an electric vehicle battery. Typically, in order to provide charging that is reliable, efficient, and timely, charges are designed with a high current draw. However, such chargers tend to result in a residential service overload condition. In order to avoid residential service overload, many residences require an upgrade to a residential electric system. For example, in some instances it may be necessary to upgrade the electrical panel in order to adequately accommodate a level 2 (e.g., 7-11 kW) electric vehicle charger that would require 40-60 amps.

Various solutions have been sought in order to make residential charging less expensive so that more customers will use electric vehicles. In some instances, the associated cost associated with necessary electrical upgrades to service electric vehicle chargers may discourage some individuals from purchasing electric vehicles.

BRIEF SUMMARY

Shortcomings of the prior art are overcome and additional advantages are provided through the provision of an electrical system that includes a first circuit configured to facilitate regulating an electric current to an electric vehicle charger that is electrically coupled to an electrical control switch, where the electrical control switch may be preferentially dedicated to an electrical device. The first circuit includes the electrical control switch, a power distribution block, a first compact circuit protector, a current transformer, and the electrical device, that are electrically coupled via a conductor. Further, the conductor feeds back to the electrical control switch from the current transformer to complete the first circuit. Additionally, the power distribution block is configured to split the electric current received from the electrical control switch to the first compact circuit protector, a second compact circuit protector and a third compact circuit protector. The electrical system also includes a second circuit that electrically couples the second compact circuit protector to a contactor and the electric vehicle charger. Further, the second circuit is configured to transmit, via the contactor, the electric current received by the power distribution block to the electric vehicle charger, where the contactor has a default position that is closed to complete the second circuit. Additionally, the third compact circuit protector includes a control circuit configured to receive, via a third circuit and based on the current transformer detecting a current draw flowing therethrough, an electrical input from the current transformer. The control circuit is configured to propagate, based on receiving the electrical input, a signal to the contactor to switch open, thereby interrupting the electric current to the electric vehicle charger.

Also disclosed herein is an electrical system that includes a first electrical circuit configured to transmit an electric current from an electrical control switch to a power distribution block. The power distribution block is configured to split the electric current to, in part, a current transformer via a first compact circuit protector. Further, the current transformer is configured to further transmit the electric current to an electrical device. A second electrical circuit configured to further transmit the electric current that is split from the power distribution block, where the electric current is split, via a second compact circuit protector, to a contactor that has a default position that is closed to further transmit the electric current to an electric vehicle charger.

A method of interrupting an electric circuit is provided. The method includes receiving, by a control circuit of an electrical system, an electrical input from a current transformer, where the current transformer is electrically coupled to a transformer sensor configured to detect an electrical load flowing through the current transformer. Further, the electrical load flowing through the current transformer is transmitted, via a conductor and based on an electrical device being activated, to the electrical device. The method further includes transmitting, by the control circuit, an electrical signal from the control circuit to a contactor, where the contactor includes separable contacts having a closed default position and configured to open based on receiving the electrical signal and the opening of the separable contacts interrupts the current flow to an electric vehicle charger.

Additional features and advantages are realized through the concepts described herein.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
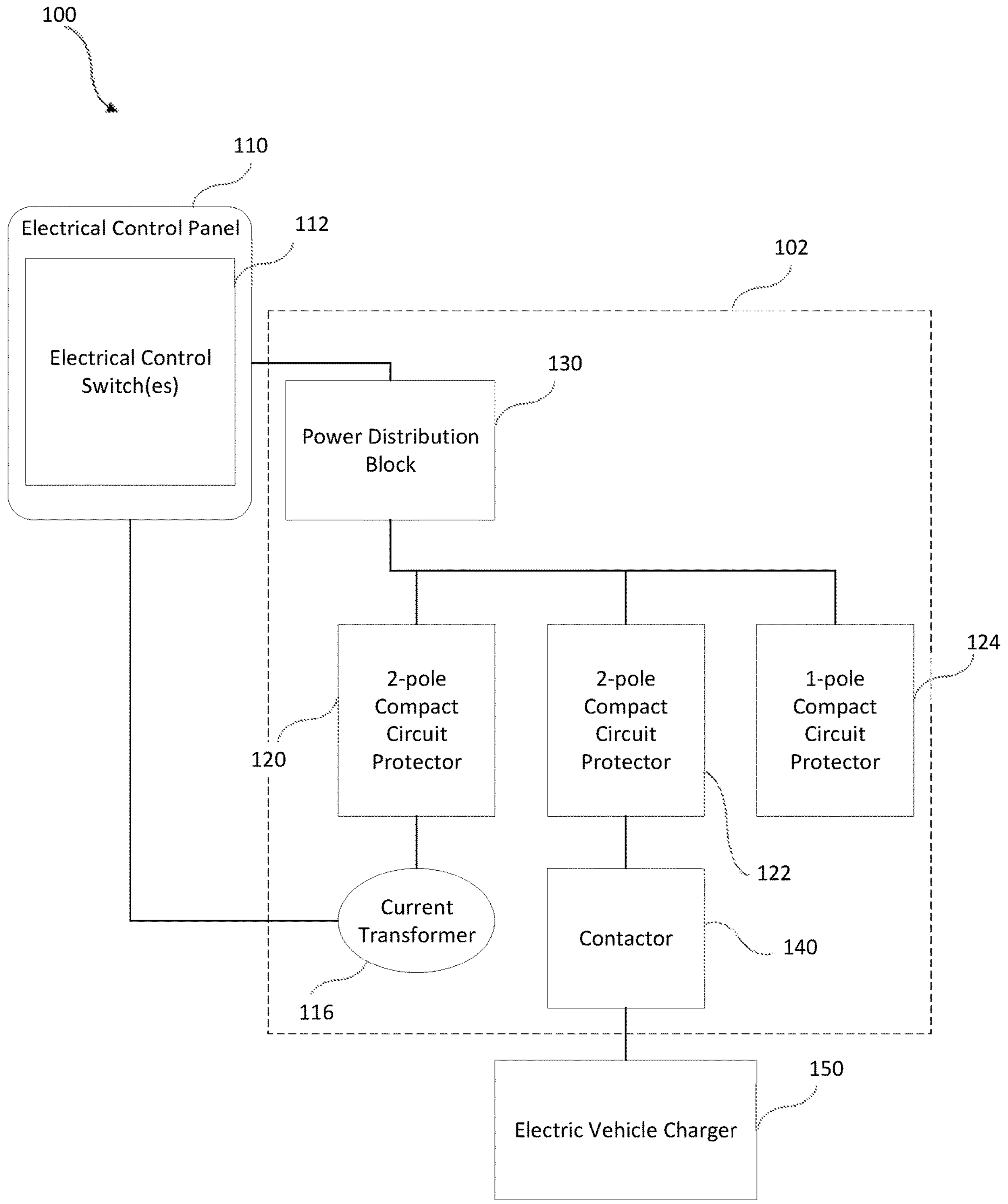
FIG. 1 depicts a block diagram of an example electrical system, according to an implementation of the present disclosure.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The terms “couple,” “coupled,” “couples,” “coupling,” and the like should be broadly understood to refer to connecting two or more elements or signals electrically and/or mechanically, either directly or indirectly through intervening circuitry and/or elements. Two or more electrical elements may be electrically coupled. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. “Electrically coupled” and the like should be broadly understood and include coupling involving any electrical signal, whether a power signal, a data signal, and/or other types or combinations of electrical signals.

Disclosed herein is an electrical system that includes a first circuit configured to facilitate regulating an electric current to an electric vehicle charger that is electrically coupled to an electrical control switch that is preferentially dedicated to an electrical device. The first circuit includes the electrical control switch, a power distribution block, a first compact circuit protector, a current transformer, and the electrical device electrically coupled (e.g., in series) via a conductor. Further, the conductor feeds back to the electrical control switch from the current transformer to complete the first circuit. Additionally, the power distribution block is configured to split the electric current received from the electrical control switch to the first compact circuit protector, a second compact circuit protector and a third compact circuit protector. The electrical system also includes a second circuit that electrically couples the second compact circuit protector to both a contactor and the electric vehicle charger. The second circuit is configured to transmit, via the contactor, the electric current received by the power distribution block to the electric vehicle charger, where the contactor has a default position that is closed to complete the second circuit. Additionally, the third compact circuit protector includes a control circuit configured to receive, via a third circuit and based on the current transformer detecting a current draw flowing therethrough, an electrical input from the current transformer, and based thereon propagate a signal to the contactor to switch open, thereby interrupting the electric current to the electric vehicle charger.

FIG. 1 depicts a block diagram of an example electrical system 100, according to one embodiment. The example electrical system 100 includes an electric vehicle (EV) saver 102 that is configured to facilitate regulating an electric current to an electric vehicle charger 150. The electric vehicle charger 150 may be any suitable vehicle charger, according to various embodiments. For instance, the electric vehicle charger 150 may include a residential level charger such as a level 1 charger that plugs into a standard 120V outlet or a level 2 charger that plugs into a 240V outlet. The electric vehicle charger 150 is electrically coupled to an electrical control switch 112 of an electrical control panel 110. Oftentimes, residential households have an electrical control panel 110 that is inadequate to handle the additional load that would be needed to charge an electric vehicle, and upgrading the electrical control panel 110 can be very expensive. The example electrical system 100 would allow for the electrical control panel 110 to handle the additional load for charging the electric vehicle without requiring an upgrade to the electrical control panel 110.

In particular, this advantage is realized through the use of the electrical control panel 110 includes the electrical control switch 112 that is shared with both the electric vehicle charger 150 and an electrical device (not shown) that has a high current rating such as, for example, a thermostatically controlled device. For instance, according to one embodiment, the thermostatically controlled device may include a residential appliance (e.g., a stovetop, oven, and/or range).

According to an implementation of the present disclosure, the example electrical system 100 may only increase the load to the electrical control panel 110 based on the amperage differential at the electrical control switch 112 between the electrical device (not shown) and the electric vehicle charger 150. According to various embodiments, the amperage differential could be, for example, about 0 amps to about 40 amps depending upon the amperage of the electrical device (not shown) and the electric vehicle charger 150. As disclosed herein the electrical system 100 may eliminate the need to replace the electrical control panel 110, thereby providing cost savings, but the electrical control switch 112 may need to be replaced in order to accommodate both the electrical device (not shown) and the electric vehicle charger 150 based on the associated amperage differential. The electrical control panel 110 may have size limitations depending upon the specific manufacturer limitations such as, for example, a limitation of about 70 amp to 100 amp limitation per bus stab/finger that receives the electrical control switch 112.

The EV saver 102 includes a power distribution block 130 that is electrically coupled to and fed from the electrical control switch 112. The power distribution block 130 is configured to split the electric current received from the electrical control switch 112. The power distribution block 130 may include, according to various embodiments, multiple finger-safe power distribution blocks ganged together. In particular, the finger-safe power distribution blocks may include two Bussmann series panel mount fuse blocks such as the PDBFS330 (380 amp fuse block) and PDBFS204 (175 amp fuse block) by Eaton Corporation of St. Louis, Missouri. The multiple finger-safe power distribution blocks may facilitate connection to a phase conductor sized up to about 100 amp. As described herein, a conductor may include such diverse members as an electrical cable, a wire (either stranded or solid), a grounding plate, an inductive shield, a bus bar, or an electricity-transmitting path formed of a conductive film deposited on an insulating plate or panel, etc.

The power distribution block 130 splits the electric current to a plurality of compact circuit protectors (CCPs). In particular, the power distribution block 130 is electrically coupled to and splits the electric current to a first compact circuit protector 120, a second compact circuit protector 122, and a third compact circuit protector 124. The CCPs may be overcurrent devices for a particular current range.

According to various embodiments, the first compact circuit protector 120 may include a first two-pole device configured to take a first fuse rated from about 35 amps to about 60 amps, which likely corresponds to the load of the electrical device (not shown). Further, the second compact circuit protector 122 may include a second two-pole device configured to take a second fuse having a rating that is based on the amperage demand of the electric vehicle charger 150. According to various embodiments, the second compact circuit protector may be sized to a specific amperage demand. For instance, if the load from the electric vehicle charger 150 were about 25 amps then the second compact circuit protector 122 selected may include a current rating of about 30 amps because it takes fuses from about 1 amp to about 30 amps. Similarly, if the load from the electric vehicle charger 150 were about 50 amps, then the second compact circuit protector 122 selected may include a current rating of about 60 amps because it takes fuses having a rating from about 35 amps to about 60 amps. In one embodiment, if the load from the electric vehicle charger 150 were 80 amps, then the second compact circuit protector 122 selected may include a current rating of about 100 amps because it takes fuses having a rating from about 70 amps to about 100 amps. The advantage to adapting the second compact circuit protector 122 to the amperage demand of the electric vehicle charger 150 is that it would be fine-tuned to match actual loads and only a limited number of EV saver 102 device options would need to be made available to consumers in the marketplace.

According to various embodiments, the third compact circuit protector 124 may include a single-pole device configured to take a third fuse having a current rating of about 30 amp that takes fuses from about 1 amp to about 30 amps. Additionally, the third compact circuit protector 124 serves as the control circuit for the EV saver 102.

The EV saver 102 further includes a current transformer 116 electrically coupled to the first compact circuit protector 120. In particular, the current transformer 116 may be configured such that the conductor(s) fed from the first compact circuit protector 120 pass through the current transformer 116. The current transformer 116 is configured to detect a current draw flowing therethrough and based thereon transmit an electrical input to a contactor 140 of the EV saver 102. The current draw that the current transformer 116 detects would result from a load demand from the electrical device (not shown) in response to the electrical device being activated or otherwise turned on. For example, if the electrical control switch 112 is electrically coupled to both an oven and a user turns the oven on to bake a food item, for instance, then the activation of the oven would cause the current transformer 116 to detect a load demand from the oven and transmit the electrical input to the third compact circuit protector 124. The conductor(s) fed from the first compact circuit protector 120, which pass through the current transformer 116, feed back to the electrical control switch 112 from the current transformer 116 to complete the associated circuit connection.

As referenced in the preceding paragraph, the EV saver 102 also includes a contactor 140. The contactor 140 is electrically coupled to and fed, via a conductor, by the second compact circuit protector 122. As described herein, a contactor 140 includes any electricity-conducting component of an electrical connector, including a contact surface intended to form a readily made and broken electricity-conducting joint by directly engaging either a conductor or a corresponding surface of a cooperating joint-forming conductive component, so as to permit the passage of electricity through the joint from one component to the other. According to one embodiment, the contactor 140 may include an electromagnetic coil and separable contacts, where the electromagnetic coil is configured to cause the separable contacts to open in response to receiving the signal from the control circuit of the third compact circuit protector 124. According to one embodiment, the separable contacts may include an electrical contact and additional supporting structure that is specially adapted to make with a specific complementary electrical contact. The separable contacts are a coupling part or electrically coupling part that includes a contact and a counter-contact.

In particular, the joint-forming conductive component of the contactor 140 includes separable contacts having a closed default position. The example electrical system 100 is preferentially dedicated to the electrical device such that when the electrical device (not shown) is activated, the control circuit of the third compact circuit protector 124 would energize the contactor 140 so that the contactor 140 opens to reduce the likelihood that the electrical control switch 112 gets overloaded from having a load from both the electric vehicle charger 150 and the electrical device (not shown). Thus, upon receiving a signal from the third compact circuit protector 124, the separable contacts are opened, thereby interrupting the current flow to an electric vehicle charger 150 resulting in non-coincidental loads of the electric vehicle charger 150 and the electrical device (not shown). Conversely, since the separable contacts of the contactor 140 have a closed default position, when the electrical device (not shown) is not activated, the contactor 140 would not be energized and current would be fed to the electric vehicle charger 150 to facilitate charging an electric vehicle.

According to various embodiments, the disclosed electrical system 100 may be programmed to delay charging the electric vehicle for a predetermined amount of time after the current transformer 116 stops detecting the load demand from the electrical device (not shown). For instance, once the load demand is no longer detected by the current transformer 116, the control circuit of the third compact circuit protector 124 may continue to energize the contactor 140, (e.g., via an electromagnetic coil) so that the separable contacts remain open for the predetermined amount of time (e.g., 20 minutes). If the electrical device (not shown) is an oven, for example, the predetermined amount of time may allow for the oven to be activated periodically or irregularly (e.g., every 2-3 minutes) to maintain a desired temperature without having to be constantly activated during baking in order to maintain preference or priority of current flow in the electrical system 100. Various other advantages are also contemplated and may be obtained by delaying the closure of the separable contacts. The predetermined amount of time may be, according to one embodiment, customizable by the user. Once the electrical device (not shown) has been idle and the load demand has not been detected by the current transformer 116 for the predetermined amount of time then the control circuit of the third compact circuit protector 124 may stop energizing the contactor 140.

Figure 2A:
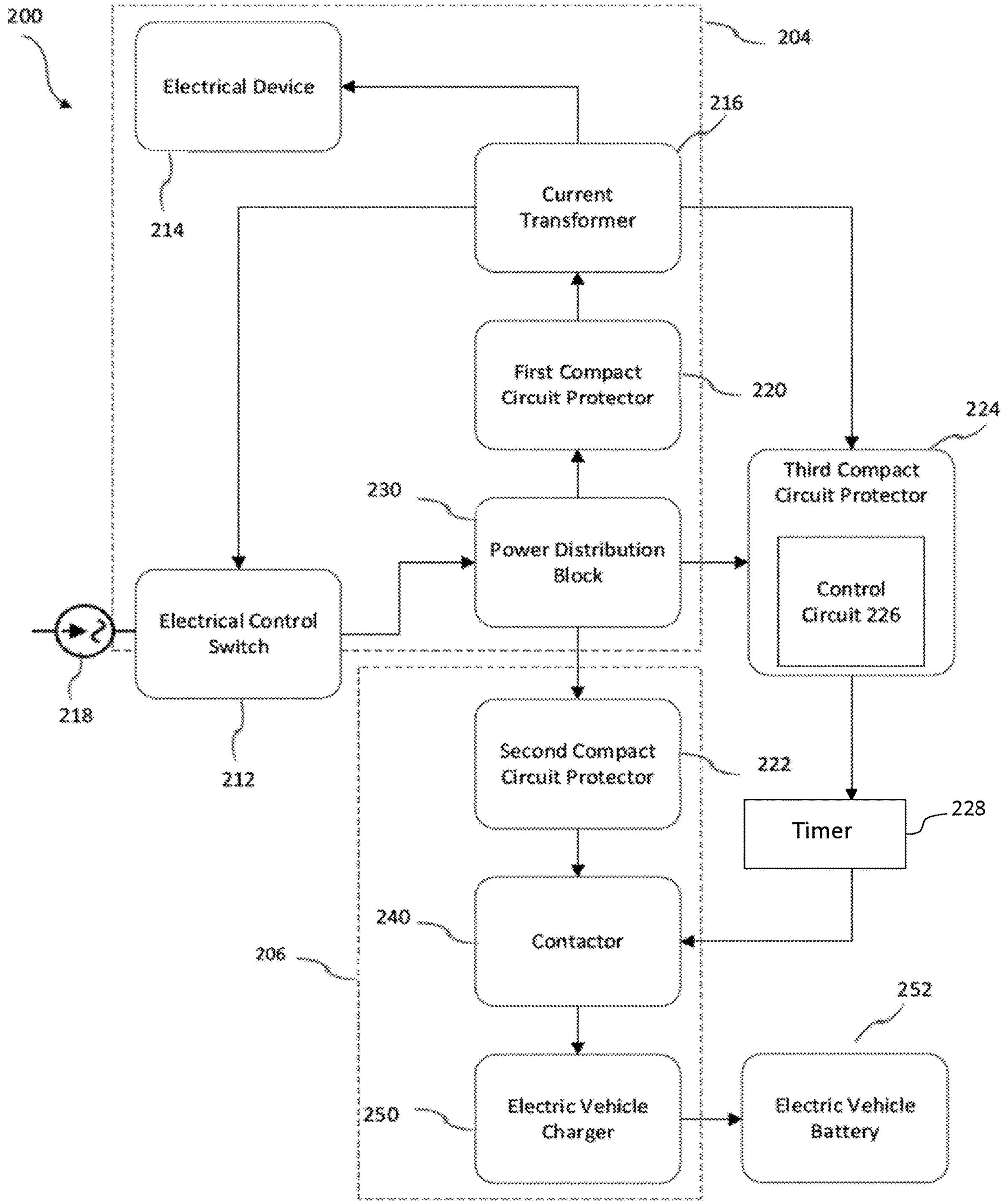
FIG. 2A depicts a block diagram of an example electrical system, according to an implementation of the present disclosure.

FIG. 2A depicts a block diagram of an example electrical system 200, according to an implementation of the present disclosure. The electrical system 200 may include a first circuit 204 configured to facilitate regulating an electric current to an electric vehicle charger 250 that is electrically coupled to an electrical control switch 212, the electrical control switch 212 being preferentially dedicated to an electrical device 214. The first circuit includes the electrical control switch 212, a power distribution block 230, a first compact circuit protector 220, a current transformer 216, and the electrical device 214, that are electrically coupled in series via one or more conductors. As depicted, a conductor feeds back to the electrical control switch 212 from the current transformer 216 to complete the first circuit 204. The electrical control switch 212 may be included as part of an electrical control box at a residential structure, and the electrical control switch 212 is configured to receive an AC electric current 218 from an external power source (e.g., distribution lines connected to a neighborhood transformer).

The power distribution block 230 is configured to split the electric current received from the electrical control switch 212 to the first compact circuit protector 220, a second compact circuit protector 222 and a third compact circuit protector 224. The second compact circuit protector 222 is included in a second circuit 206 that electrically couples the second compact circuit protector 222 to a contactor 240 and the electric vehicle charger 250. The second circuit 206 is configured to transmit, via the contactor 240, the electric current received by the power distribution block 230 to the electric vehicle charger 250. When closed, the contactor 240 completes the second circuit 206 to facilitate charging the electric vehicle battery 252.

The third compact circuit protector 224 includes a control circuit 226 configured to receive, via a third circuit (see FIG. 2D) an electrical input from the current transformer 216. The electrical input is received based on the current transformer 216 detecting a current draw flowing therethrough and transmitting an electrical input to the control circuit 226. According to one embodiment, the current transformer 216 includes a current transformer sensor that is configured to detect the current draw flow through the current transformer 216. Based on receiving the electrical input from the current transformer 216, the control circuit 226 propagates a signal to the contactor 240 to switch open, thereby interrupting the electric current to the electric vehicle charger 250. In the electrical system 200 represented in FIG. 2A, the control circuit 226 includes a timer 228 that requires the electrical device 214 to be idle for a predetermined amount of time prior to the control circuit activating the contactor 240 and thereby closing the second circuit 206 to facilitate charging via the electric vehicle charger 250.

According to one embodiment, the control circuit 226 may include an integrated wiring arrangement configured to electrically couple a plurality of input terminals to a plurality of output terminals to facilitate electrical current flow.

Figure 2B:
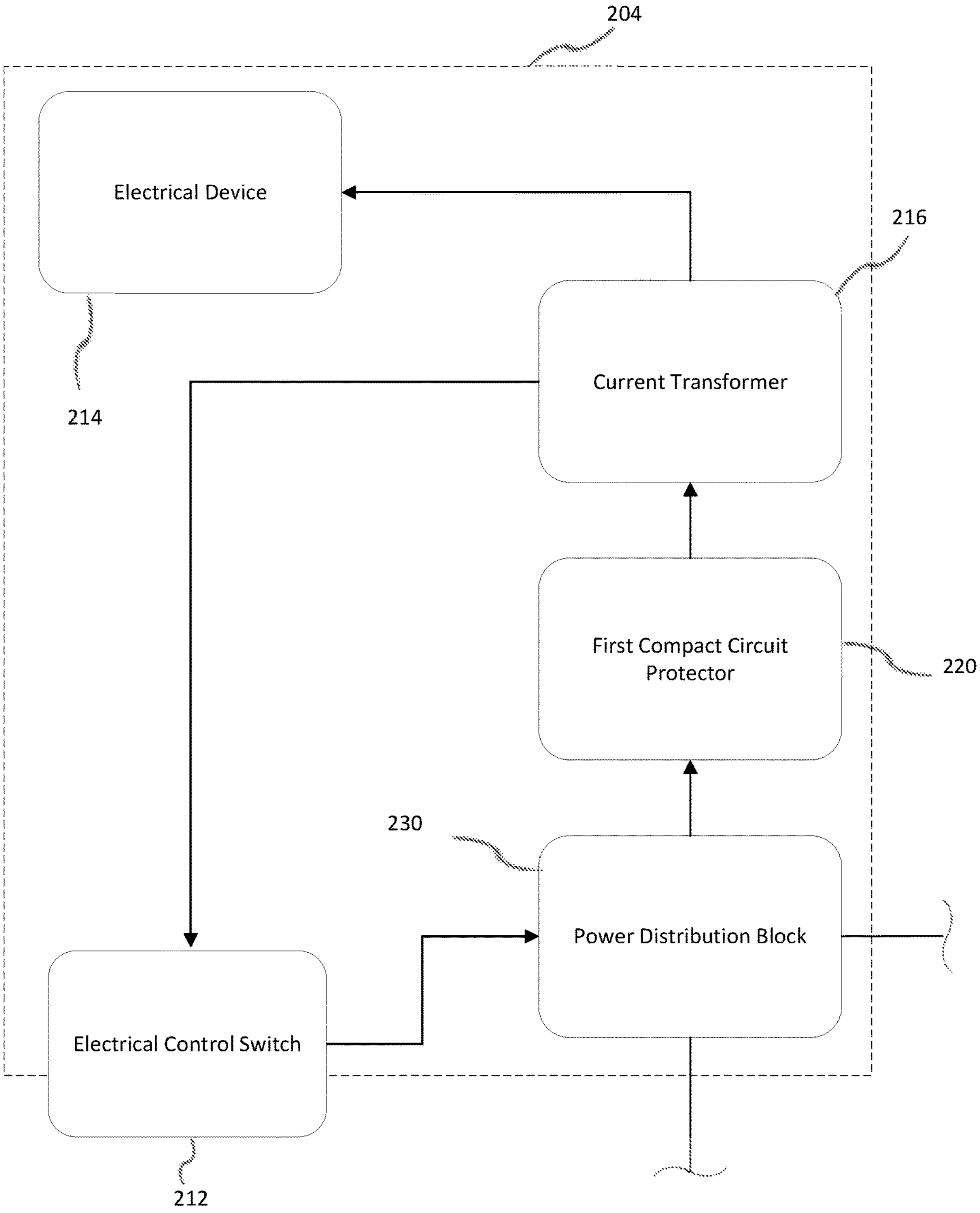
FIG. 2B depicts an example first circuit from the diagram of the electrical system of FIG. 2A, according to an implementation of the present disclosure.

FIG. 2B depicts an example first circuit 204 from the diagram of the electrical system 200 of FIG. 2A, according to an implementation of the present disclosure. The first circuit 204 includes the power distribution block 230, the first compact circuit protector 220, the current transformer 216 and the electrical device 214. The feedback from the current transformer 216 to the electrical control switch 212 of the electrical control panel completes the circuit.

Figure 2C:
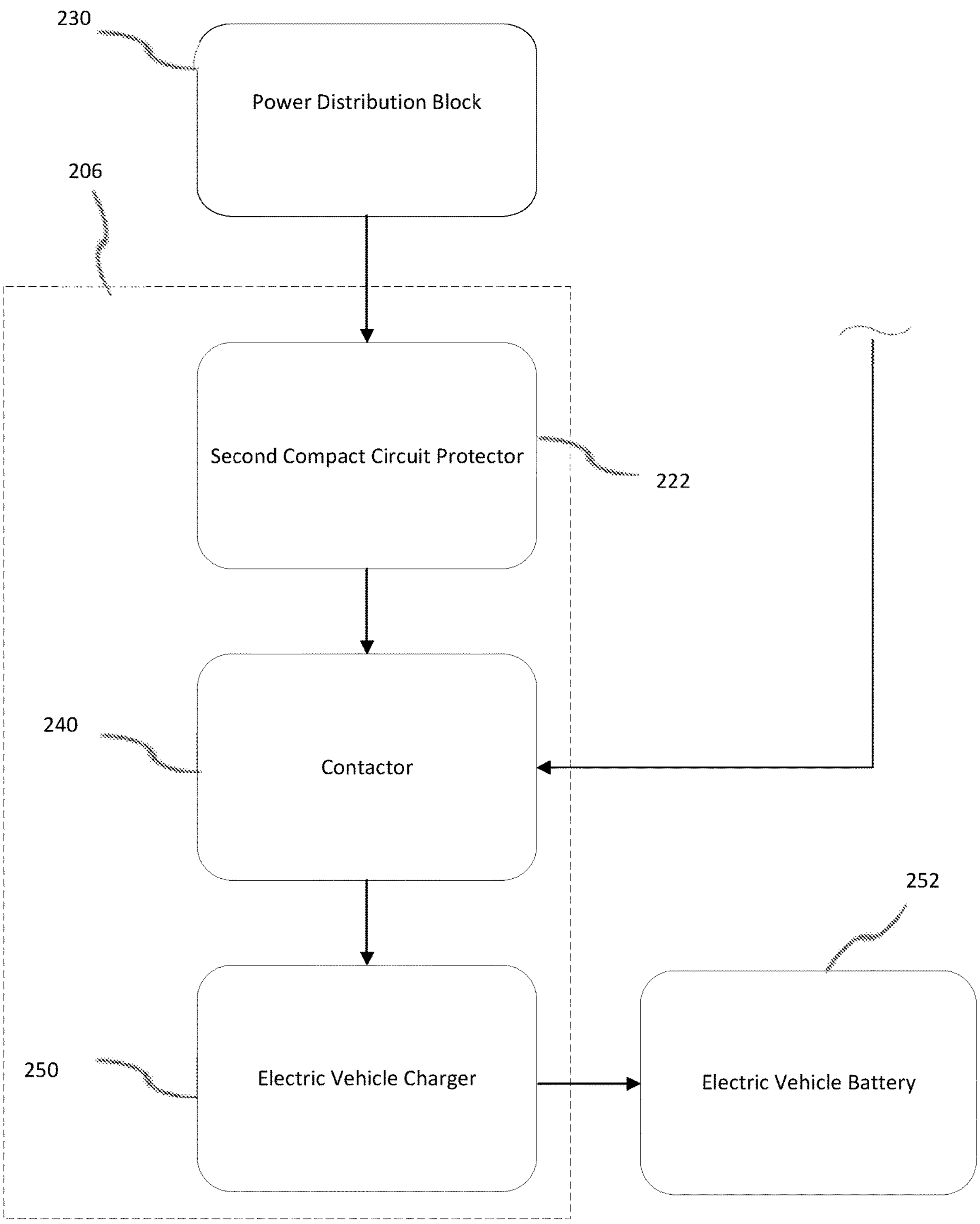
FIG. 2C depicts an example second circuit from the diagram of the electrical system of FIG. 2A, according to an implementation of the present disclosure.

FIG. 2C depicts a diagram of an example second circuit 206 of the electrical system 200 of FIG. 2A, according to an implementation of the present disclosure. The second circuit includes a second compact circuit protector 222, a contactor 240, and an electric vehicle charger 250. As depicted, the electric vehicle charger 250 transmits current to the electric vehicle battery 252 to charge the electric vehicle.

Figure 2D:
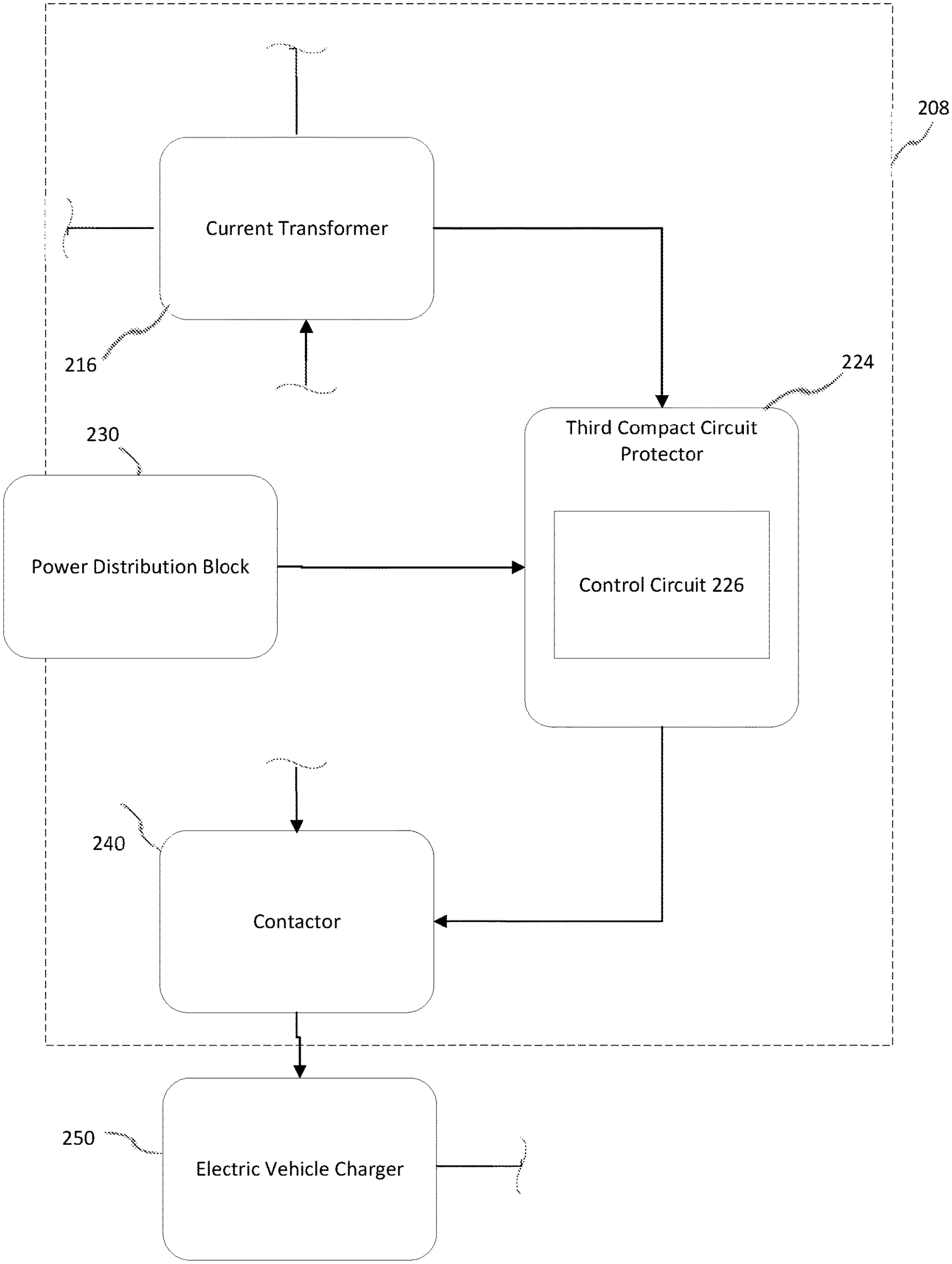
FIG. 2D depicts a diagram of an example third circuit of the electrical system of FIG. 2A, according to an implementation of the present disclosure.

FIG. 2D depicts a diagram of an example third circuit 208 of the electrical system 200 of FIG. 2A, according to an implementation of the present disclosure. The third circuit 208 electrically couples the current transformer 216 to the third compact circuit protector 224 such that the control circuit 226 of the third compact circuit protector can receive an electrical input from the current transformer 216 when the current transformer 216 detects, via a transformer sensor, an electrical load flowing through the current transformer 216. Once the control circuit 226 receives the electrical input, the control circuit 226 transmits an electrical signal to the contactor 240 to open the contactor and interrupt current flow to the electric vehicle charger 250.

Figure 3:
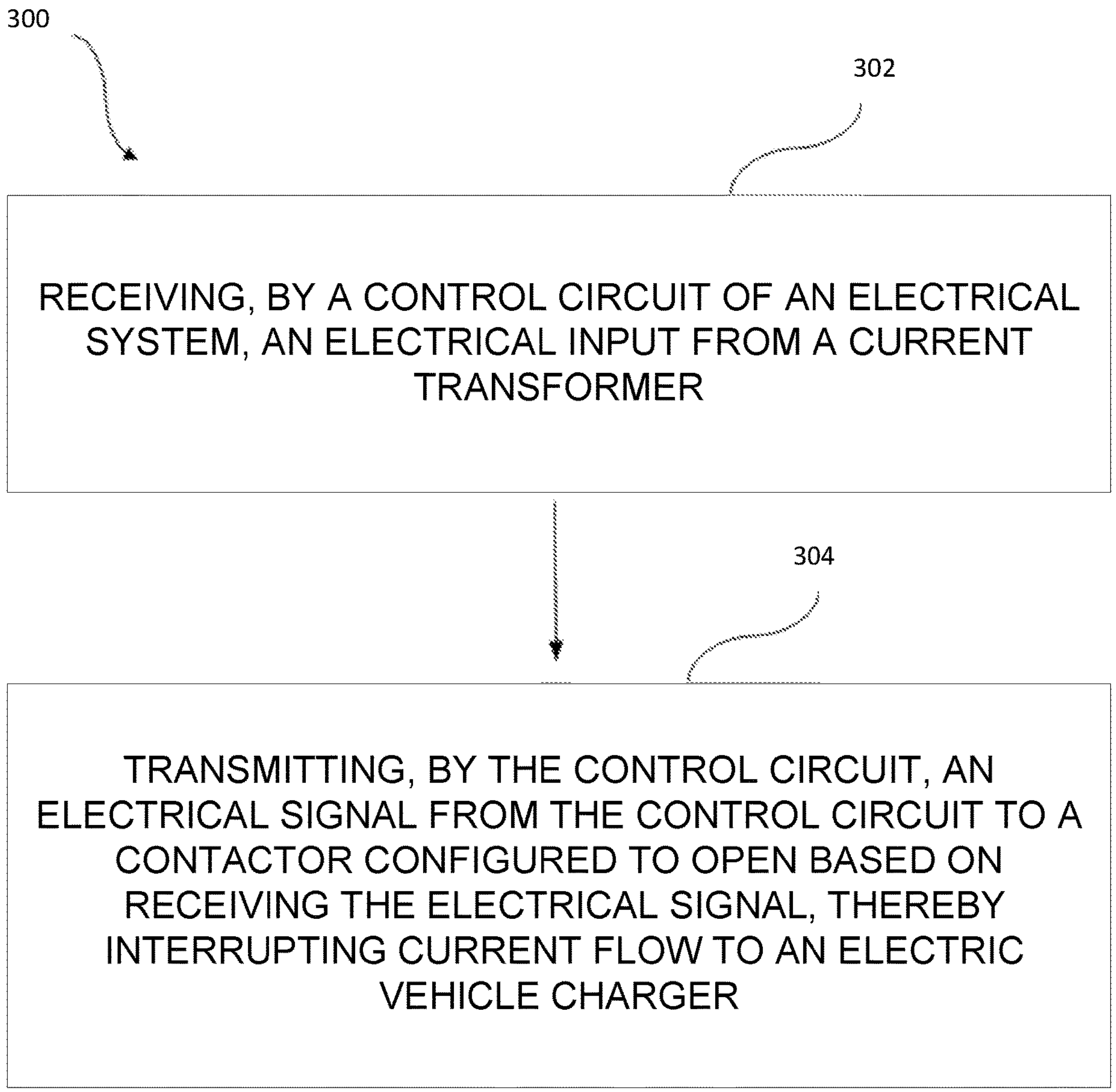
FIG. 3 is a flowchart of an example method of interrupting an electric circuit, according to an implementation of the present disclosure.

FIG. 3 is a flowchart of an example method 300 of interrupting an electric circuit, according to an implementation of the present disclosure. The method 300 represents one example of a workflow for interrupting the electric current in response to detecting an electrical load when an electrical device is activated.

In step 302, the control circuit of an electrical system receives an electrical input from a current transformer, where the current transformer is electrically coupled to a transformer sensor configured to detect an electrical load flowing through the current transformer. Further, the electrical load flowing through the current transformer is transmitted to the electrical device via a conductor in response to the electrical device being activated.

In step 304, the control circuit transmits an electrical signal from the control circuit to a contactor, where the contactor includes separable contacts having a closed default position that are configured to open based on receiving the electrical signal. Once the separable contacts open, current flow to an electric vehicle charger is interrupted.

According to various embodiments, the control circuit of the electrical system may be electrically coupled to an electrical control switch configured to transmit an electrical current to a power distribution block, where the power distribution block is configured to split the electrical current to a first compact circuit protector, a second compact circuit protector, and a third compact circuit protector, where the third compact circuit protector comprises the control circuit.

Additionally, according to various embodiments, the first compact circuit protector may be configured to transmit the electrical current that is split by the power distribution block to the current transformer, where the first compact circuit protector includes a first two-pole device, and where the first two-pole device includes a first fuse rated from about 35 amps to about 60 amps.

According to various embodiments, the second compact circuit protector is configured to transmit the electrical current that is split by the power distribution block to the contactor, where the second compact circuit protector includes a second two-pole device, and where the second two-pole device includes a second fuse having rating that is based on amperage demand of the electric vehicle charger.

In one embodiment, the method 300, may include another step (not shown) that includes disrupting, by the control circuit and based on the electrical device being deactivated, transmission of the electrical signal to the contactor, wherein the disrupting facilitates returning the separable contacts to the closed default position thereby causing the current flow to propagate through the contactor to the electric vehicle charger.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprise” (and any form of comprise, such as “comprises” and “comprising”), “have” (and any form of have, such as “has” and “having”), “include” (and any form of include, such as “includes” and “including”), and “contain” (and any form contain, such as “contains” and “containing”) are open-ended linking verbs. As a result, a method or device that “comprises”, “has”, “includes” or “contains” one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An electrical system, comprising:

a first circuit configured to facilitate regulating an electric current to an electric vehicle charger that is electrically coupled to an electrical control switch, the electrical control switch being preferentially dedicated to an electrical device, the first circuit comprising:

the electrical control switch, a power distribution block, a first compact circuit protector, a current transformer, and the electrical device, that are electrically coupled via a conductor, wherein the conductor feeds back to the electrical control switch from the current transformer to complete the first circuit;

wherein the power distribution block is configured to split the electric current received from the electrical control switch to the first compact circuit protector, a second compact circuit protector and a third compact circuit protector; and a second circuit electrically coupling the second compact circuit protector to a contactor and the electric vehicle charger, wherein the second circuit is configured to transmit, via the contactor, the electric current received by the power distribution block to the electric vehicle charger, wherein the contactor has a default position that is closed to complete the second circuit;

wherein the third compact circuit protector includes a control circuit configured to receive, via a third circuit and based on the current transformer detecting a current draw flowing therethrough, an electrical input from the current transformer, and based thereon propagate a signal to the contactor to switch open, thereby interrupting the electric current to the electric vehicle charger.

2. The electrical system of claim 1, wherein the third circuit electrically couples the current transformer to the third compact circuit protector and electrically couples the third compact circuit protector to the contactor.

3. The electrical system of claim 1, further comprising a current transformer sensor electrically coupled to the current transformer, wherein the current transformer sensor is configured to detect the current draw flow through the current transformer.

4. The electrical system of claim 1, wherein the contactor includes an electromagnetic coil and separable contacts, wherein the electromagnetic coil is configured to cause the separable contacts to open in response to receiving the signal from the control circuit.

5. The electrical system of claim 1, wherein the first compact circuit protector includes a first two-pole device, wherein the first two-pole device includes a first fuse rated from about 35 amps to about 60 amps.

6. The electrical system of claim 1, wherein the second compact circuit protector includes a second two-pole device, wherein the second two-pole device includes a second fuse having rating that is based on amperage demand of the electric vehicle charger.

7. The electrical system of claim 6, wherein the second fuse has a rating from about 70 amps to about 100 amps.

8. The electrical system of claim 1, wherein the third compact circuit protector includes a single-pole device, wherein the single-pole device includes a third fuse rated from about 1 amp to about 30 amps.

9. The electrical system of claim 1, wherein the electrical device comprises a thermostatically controlled device.

10. The electrical system of claim 1, wherein the power distribution block includes multiple finger-safe power distribution blocks ganged together.

11. The electrical system of claim 1, wherein the control circuit includes a timer that requires the electrical device to be idle for a predetermined amount of time prior to the control circuit activating the contactor and thereby closing the second circuit to facilitate charging via the electric vehicle charger.

12. An electrical system comprising:

a first electrical circuit configured to transmit an electric current from an electrical control switch to a power distribution block, wherein the power distribution block is configured to split the electric current to, in part, a current transformer via a first compact circuit protector, wherein the current transformer is configured to further transmit the electric current to an electrical device; and a second electrical circuit configured to further transmit the electric current that is split from the power distribution block, wherein the electric current is split, via a second compact circuit protector, to a contactor that has a default position that is closed to further transmit the electric current to an electric vehicle charger.

13. The electrical system of claim 12, wherein the electric current that is split from the power distribution block is further transmitted to a third compact circuit protector, the third compact circuit protector comprising a control circuit that is electrically coupled with a sensor configured to detect transmission of the electric current through the current transformer to the electrical device.

14. The electrical system of claim 13, wherein the electric current is further transmitted, based on the sensor detecting transmission of the electric current through the current transformer to the electrical device, from the control circuit to the contactor, and based thereon opening separable contacts of the contactor, thereby interrupting flow of the electric current to the electric vehicle charger.

15. A method of interrupting an electric circuit, the method comprising:

receiving, by a control circuit of an electrical system, an electrical input from a current transformer, the current transformer being electrically coupled to a transformer sensor configured to detect an electrical current flowing through the current transformer, wherein the electrical current flowing through the current transformer is transmitted, via a conductor and based on an electrical device being activated, to the electrical device; and transmitting, by the control circuit, an electrical signal from the control circuit to a contactor, the contactor including separable contacts having a closed default position and configured to open based on receiving the electrical signal, wherein the opening of the separable contacts interrupts current flow to an electric vehicle charger, wherein the control circuit of the electrical system is electrically coupled to an electrical control switch configured to transmit an electrical current to a power distribution block, wherein the power distribution block is configured to split the electrical current to a first compact circuit protector, a second compact circuit protector, and a third compact circuit protector, wherein the third compact circuit protector comprises the control circuit.

16. The method of claim 15, wherein the first compact circuit protector is configured to transmit the electrical current that is split by the power distribution block to the current transformer, wherein the first compact circuit protector includes a first two-pole device, wherein the first two-pole device includes a first fuse rated from about 35 amps to about 60 amps.

17. The method of claim 15, wherein the second compact circuit protector is configured to transmit the electrical current that is split by the power distribution block to the contactor, and wherein the second compact circuit protector includes a second two-pole device, wherein the second two-pole device includes a second fuse having rating that is based on amperage demand of the electric vehicle charger.

18. The method of claim 15, wherein the power distribution block includes multiple finger-safe power distribution blocks ganged together.

19. The method of claim 15, further comprising disrupting, by the control circuit and based on the electrical device being deactivated, transmission of the electrical signal to the contactor, wherein the disrupting facilitates returning the separable contacts to the closed default position thereby causing the current flow to propagate through the contactor to the electric vehicle charger.

* * * * *